Figure 1:
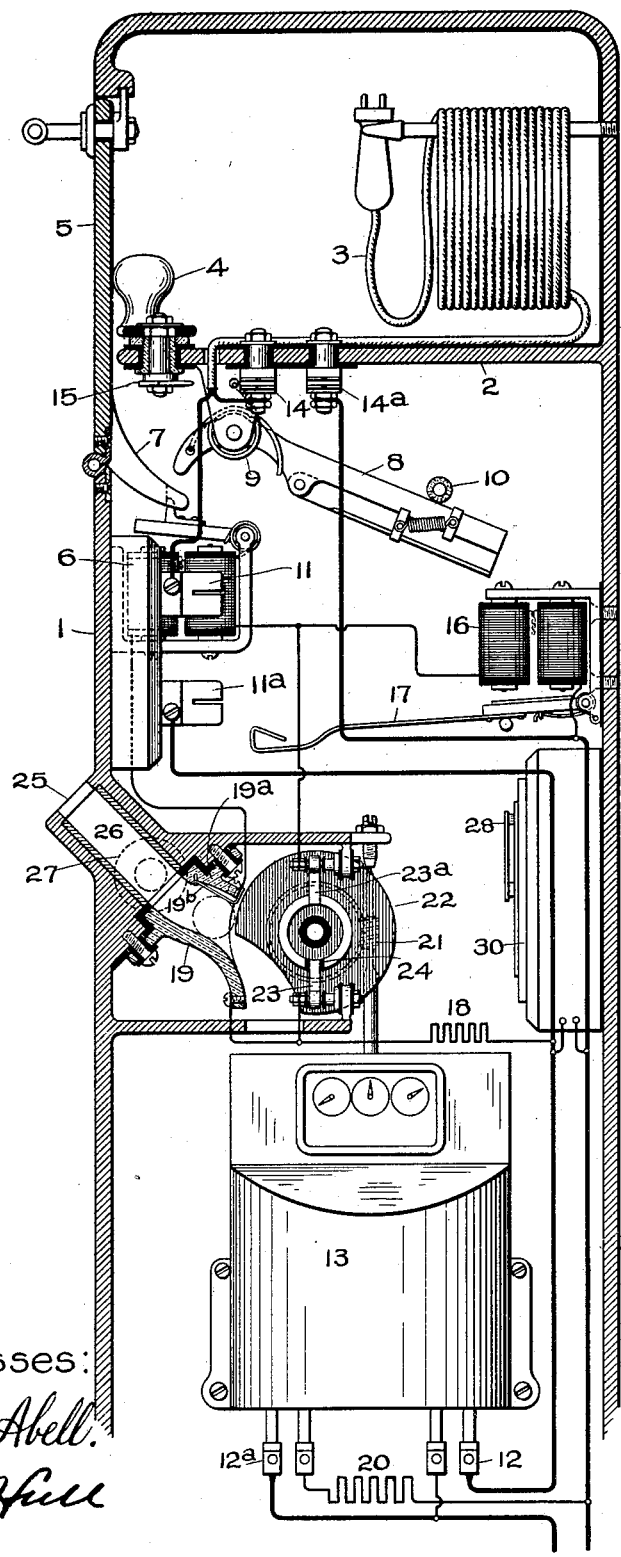

No. 735,505. PATENTED AUG. 4, 1903.
C. D. HASKINS.
CHARGING DEVICE FOR ELECTROMOBILES.
APPLICATION FILED DEC. 4, 1900.
NO MODEL. 3 SHEETS—SHEET 1.

Witnesses:
Lewis P. Abell.
B. B. Hull

Inventor:
Caryl D. Haskins,
by Albert H. Davis
Atty.

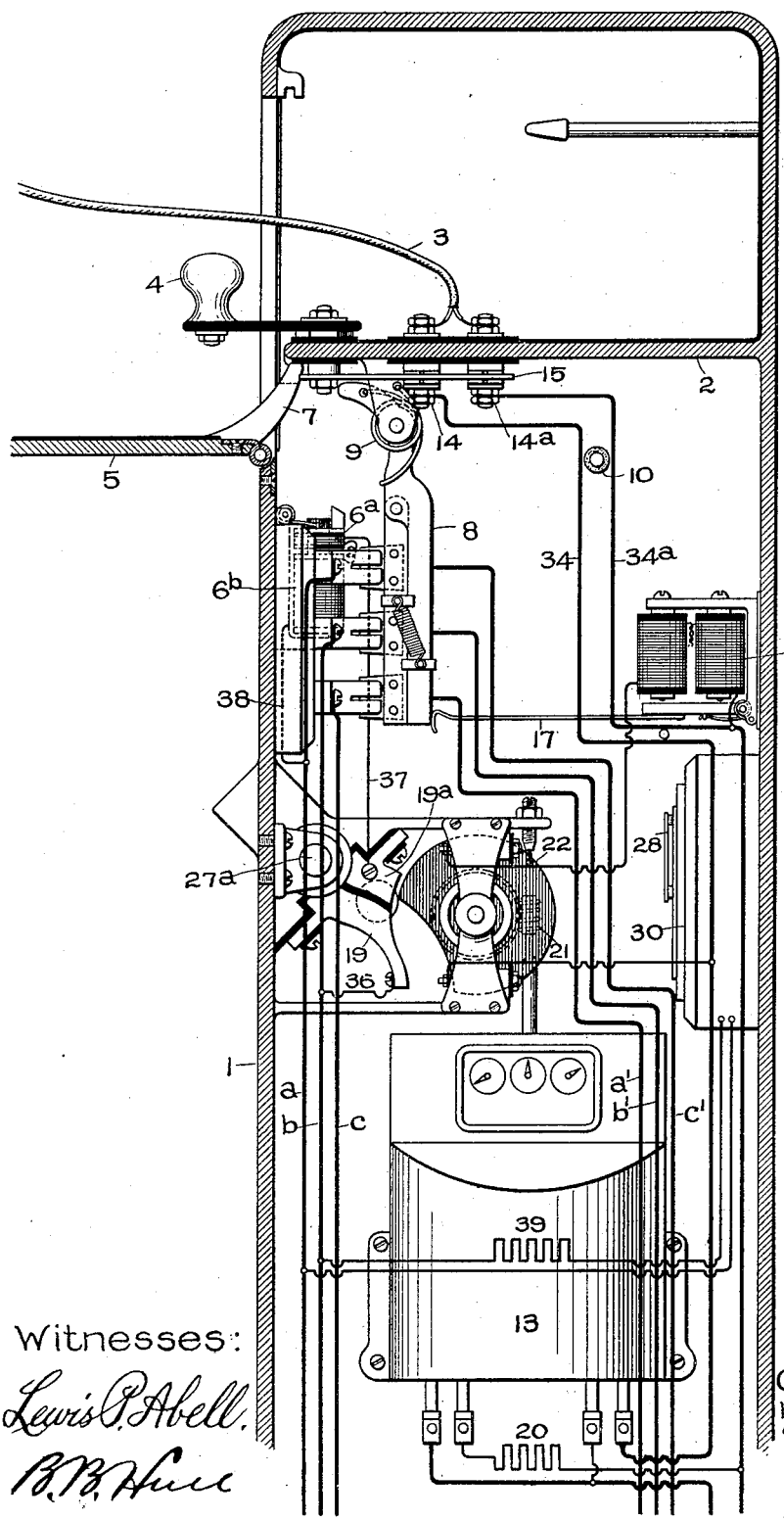

No. 735,505. PATENTED AUG. 4, 1903.
C. D. HASKINS.
CHARGING DEVICE FOR ELECTROMOBILES.
APPLICATION FILED DEC. 4, 1900.
NO MODEL. 3 SHEETS—SHEET 3.
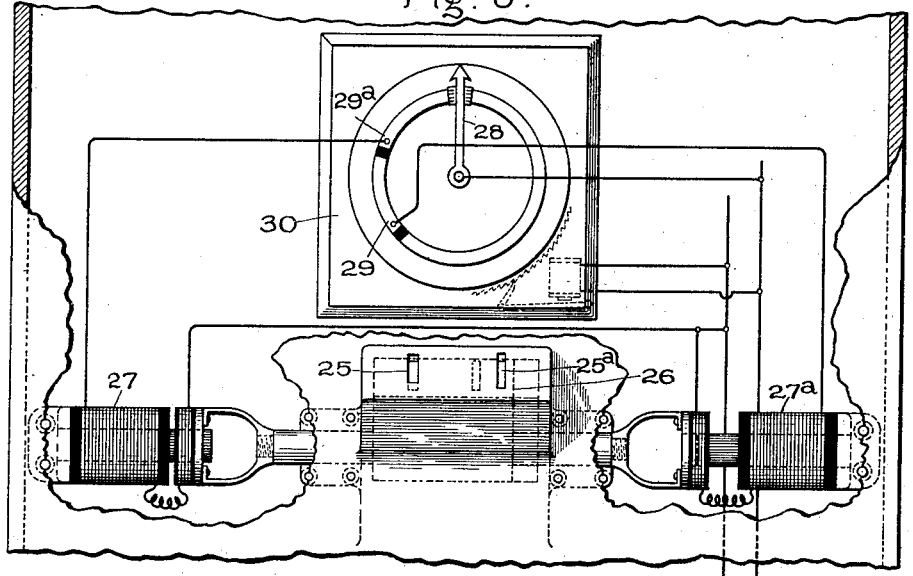
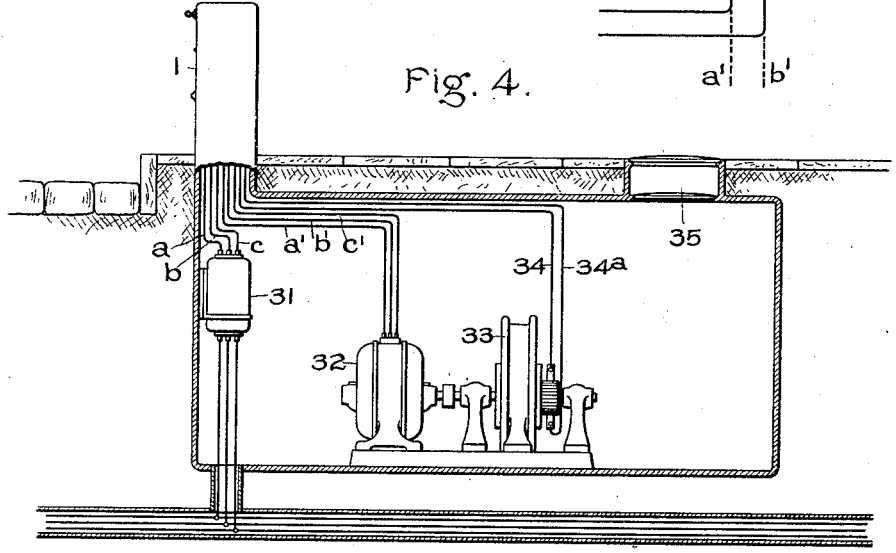
Witnesses: Inventor:
Caryl D. Haskins, No. 735,505. Patented August 4, 1903.

UNITED STATES PATENT OFFICE.

CARYL D. HASKINS, OF SCHENECTADY, NEW YORK, ASSIGNOR TO GENERAL ELECTRIC COMPANY, A CORPORATION OF NEW YORK.

CHARGING DEVICE FOR ELECTROMOBILES.

SPECIFICATION forming part of Letters Patent No. 735,505, dated August 4, 1903.

Application filed December 4, 1900. Serial No. 38,689. (No model.)

*To all whom it may concern:*

Be it known that I, CARYL D. HASKINS, a citizen of the United States, residing at Schenectady, county of Schenectady, State of New York, have invented certain new and useful Improvements in Charging Devices for Electromobiles, of which the following is a specification.

This invention relates to apparatus controlling the charging of storage batteries of electrically-propelled vehicles or other apparatus involving the use of storage batteries not having a fixed location or definite route of travel convenient to an electric supply-station.

The rapid increase in the use of electrically-propelled vehicles operated by storage batteries renders it extremely desirable that means be provided for recharging the batteries at distributed points throughout a city or system of distribution. It is the object of my invention to provide such means.

I proceed by installing at desirable distributed points in the streets or highways of the town, city, or other district in which systems of electrical distribution are provided a number of charging-stations to which the term "electrants" has been applied commercially, at which the vehicles before their batteries have been completely exhausted may obtain a fresh charge of electric energy. These charging-stations are under normal conditions inaccessible for use, but may be rendered accessible by providing means by which only authorized parties may be permitted to draw current. They are thus toll-controlled and constitute vending devices for electric energy. The result may be effected in various ways—as, for example, by providing customers with a key or by rendering the use of the charging device subject to the deposit of a coin, token, or other evidence of value received by the supply company which will automatically release covered parts when deposited in a suitable receptacle.

My invention broadly comprises a pair of circuit-terminals adapted to be connected with the storage battery of an electrically-propelled vehicle and means for permitting transmission of current to the vehicle only after a prescribed plan of procedure has been followed by which the delivery of current is limited to authorized customers. In a narrower sense the invention comprises a public charging-station to which service-leads are carried from a source of electrical distribution and means controlled by prepayment or toll-operated devices for insuring the delivery of current from the charging-station when the payment has been made. The invention may be employed with direct or alternating current systems of distribution, the local installation comprising when the latter type of system is the source a motor-generator closely adjacent to the charging-station or electrant automatically thrown into operation when the toll is paid.

The invention embodies various features of novelty which will be hereinafter fully described, and definitely indicated in the claims appended to this specification.

In the accompanying drawings, which illustrate several forms of my invention, Figure 1 is a sectional elevation of a charging post or station embodying my improvements adapted for use with a continuous-current source of supply. Fig. 2 is a similar view of a charging-post adapted for use with a source of alternating-current supply. Fig. 3 is a detail view of an attachment by which the current may be delivered at a cheaper rate during certain specified parts of the day without interfering with the delivery of current at other parts of the day and by which encouragement may be offered for the free use of current during times when the load on the station is light. Fig. 4 is a sectional detail showing the arrangement of the local converting outfit used with alternating currents. Fig. 5 is a detail of the switch-controlling apparatus of the charging-station, and Fig. 6 represents a token or form of toll which may be employed in operating the prepayment apparatus in lieu of a coin.

Referring to Fig. 1, 1 represents a hollow iron casting in the form of a post adapted to be securely anchored in the ground or side of a building. It is divided by a transverse partition 2 into two chambers, the upper of which is provided with a duplex flexible conductor 3, which may be coiled on a pin or bracket mounted in the wall of the post and which terminates in suitable terminals, by which connection may be made with terminals on the electrically-propelled vehicle leading to its battery-cells. This upper chamber contains also a switch-handle 4, access to which is governed by a hinged door 5. The lower chamber contains all of the automatically-controlled mechanism for insuring connection of the cable 3 with the supply-service. The switch controlled by the handle 4 is also instrumental in governing the delivery of current to the cable 3 and being hand-operated permits the cable to remain dead even after the door 5 has been released and the cable withdrawn until all of the connections are established and the apparatus is in condition to permit a charge. The door being opened, the switch-handle 4 may be pulled out, thus rendering the cable alive and permitting the charging to proceed. Before the door can be opened, however, a key, coin, token, or some other form of toll must be applied or fed to the machine, by which a releasing-electromagnet 6 is energized, withdrawing a stop from an arm 8, forming a rigid part of the door. In the path of the arm 7 is an extension of a switch-lever 8, controlled by a spring 9, (in detail in Fig. 5,) which is normally held by said spring against a cushioned stop 10. When the door is opened, this switch-blade is forced into a pair of spring-clips 11 11$^a$, one of which is in connection with one of the service-wires through two terminals 12 12$^a$, between which is included the series coil of a recording-wattmeter 13, such as the well-known Thomson type. The other switch-clip is connected with one of the duplex conductors of the cable 3, the other of said conductors being connected with a terminal 14, a switch-blade 15 within the lower inclosure, but governed by the handle 4 in the upper inclosure, being adapted to cross-connect or bridge this terminal 14 with a companion terminal 14$^a$, connected with the other service-wire of the distributing system. The arm 7 is so arranged with relation to the switch 8 that in opening the door 5 it forces home the switch-blade into the clips 11 11$^a$ and then passes by the operating-arm of the switch-lever, thereby permitting the door to be opened and closed after the switch has once been set without disturbing the latter. The switch is locked in this position after closure by means of an electromagnet 16, the armature 17 of which drops behind the switch-lever, as indicated in Fig. 2, and locks the latter in its closed position so long as the electromagnet 16 is energized. The releasing and locking electromagnets 6 and 16 are included in branches of a circuit across the mains and may include a resistance 18 to cut down the current, if deemed necessary. This circuit includes also two normally open points in parallel relation, one in the coin-channels governed by the introduction of a coin or token and the other governed by the operation of the meter. The coin-channel contains two ducts side by side, as will presently be more fully described, and these ducts communicate with two independent metal terminals 19 19$^a$, the latter carrying a light spring-contact 19$^b$, adapted to be engaged by a coin when introduced into the duct, as indicated in dotted lines, forming an electric bridge between the contacts 19 19$^a$, and thus completing the circuit across the mains, which include the magnets 6 and 16. The shunt-circuit of the meter, including its armature, as usual in standard Thomson recording-wattmeters, has an auxiliary resistance 20, which is permanently connected across the service-leads. This being a well-understood mode of connecting wattmeters, it has not been deemed necessary to illustrate the connections in detail. The rotary element of the meter carries an external shaft on which a worm 21 is mounted, gearing into a wheel or wheel-train operating a disk 22, which in its normal position obstructs the transit of a coin to the cash-box, as indicated in Fig. 1, but which when turned by the meter permits the coin to fall. Any approved method of accomplishing this result may be followed. The arrangement shown in the drawings comprises a disk with a segment removed from its edge, by which after a determinate range of movement the coin is freed and may fall into the box. During this range of movement a brush 23, normally bearing on the insulating-spot 24, rides upon the conducting-face of the disk and establishes a cross connection with a corresponding brush 23$^a$, completing the circuit between the mains, including the magnet 16, independently of the coin branch. The parts are so arranged that this branch is completed before the coin is permitted to fall, thereby holding the switch 8 closed by the locking-armature 17. The gearing between the worm 21 and the disk 22 is of such a ratio that the ring containing the insulating-spot 24 will have made one complete revolution and opened the locking-circuit only after the value of the prepaid coin or token in current has been delivered, upon which the armature 17 is drawn back by its retractile spring and the switch 8 automatically opened, the latter being thrown by its spring 9 forcibly out of the clips and brought to rest in the position indicated in Fig. 1. Thus current is automatically cut off from the vehicle after the prepaid amount has been delivered. Although the door is still open, it will be impossible on the part of the driver of the vehicle to procure a further charge or for any other driver to effect an active relation to the circuit until toll has again been paid. When the door is closed, the armature of magnet 6 being released locks the door in a closed position. The switch-handle 4 is so set in the upper chamber that when the switch is closed the handle will project outside of the post, thus insuring an opening of the switch when the door is closed and preventing damage from short circuits or shocks to a driver by manipulating the cable while the terminals are alive. To insure thorough protection against short circuits, the upper chamber is lined throughout with insulating material, as indicated by the black line.

It has been the custom of supply companies for a long time to offer a more liberal rate to consumers using current during times of the day when the load of the supply-station is low in order to conduce to a more uniform load-curve and enhance the economical operation of the plant. I provide for such an opportunity in my automatic charging-station by employing two coin-ducts accommodating coins of different size or other characteristic, either of which will give access to the current. One of these may be arranged to be operated by a coin, so as to be accessible to all comers during the high-rate period, and the other by a token of different size, which may be bought in quantity by regular customers. The charging-station may be arranged so as to be operated by either of these coins, thereby permitting the consumers who use current in large quantities to have a better rate than occasional consumers; but I prefer to employ in connection with the double coin-duct an automatically-controlled device which renders each duct available only during a determinate part of the diurnal period. This may be effected by an organization the details of which are seen in Fig. 3. The mouths of the coin-ducts are seen at 25 25$^a$, the former being exposed and the latter covered over by a slide 26, governed by two electromagnets 27 27$^a$. These magnets are cut into action at definite parts of the diurnal period by means of a clock-controlled circuit-closer 28 making one turn in twenty-four hours and engaging contacts 29 29$^a$ at 4.30 and 8.30 p. m., respectively. The clock which drives the hand 28 (indicated in Fig. 1 at 30) may be electrically wound, the winding-magnet being permanently connected across the service-wires. The clock is thus continuously kept wound. As clocks of this kind are well known and may be bought on the market, the details of construction are deemed unnecessary. The leads to the magnets 27 27$^a$ may be connected in shunt relation to the winding-magnet of the clock. In the position shown in Fig. 3 the magnet 27 is energized, the slot-cover 26 being shifted so as to expose the coin-slot 25, thereby permitting its use. This rate will obtain from 8.30 p. m. until 4.30 the following afternoon, after which the clock will energize the magnet 27$^a$, drawing the slot-cover so as to expose the slot 25$^a$ and covering slot 25. Slot 25$^a$ only can be used then from 4.30 p. m. until 8.30 p. m., or during the peak of the station-load, after which the slot 25 will again be automatically rendered accessible.

For alternating currents I employ in a subterranean chamber or a chamber within the building on the outside of which the delivery-station is mounted a water-tight casing containing automatic converting apparatus for transforming current delivered from a group of alternating-current mains into direct current. Such an organization is indicated in Figs. 2 and 4, the latter showing the converter contained underground and the former the delivery apparatus and toll mechanism controlling the same. The underground chamber contains a transformer 31, the primary winding of which is in fixed relation to a group of alternating-current-supply mains shown in the drawings as a triphase circuit. The secondary leads to the closed chamber in the delivery apparatus, in which is contained the switch 8 for cross-connecting the normally charged secondary mains $a\ b\ c$ with a group of mains $a'\ b'\ c'$, leading to an induction-motor 32, on the armature-shaft of which is mounted a direct-current generator 33, the leads 34 34$^a$ of which connect with terminals 14 14$^a$, similar to those already described in connection with the direct-current apparatus. The underground casing may be provided with a manhole 35, by which access may be given to the converting set for inspection and repairs. The delivery apparatus for the automatic charging-station is in all essential particulars the same as that for direct current, only a few changes being necessary. The switch 8 is provided with triple clips and contacts, as indicated, to effect the connection between the triphase mains $a\ b\ c$ and $a'\ b'\ c'$, and the controlling-magnet 6$^a$ is provided with a coil-armature instead of an iron armature, as indicated in Fig. 2. The release-magnet 6$^a$ may be connected in a branch across the low-potential alternating mains or a pair of the same, including the coin-actuated circuit-closer, as already described in connection with Fig. 1. This is indicated over the path 36, across the coin-conductor 37, magnet-coils 6$^a$ 6$^b$, and conductor 38. This when alive removes the lock from the door, permitting the latter to be dropped to the position indicated in the figure, closing the switch 8, and starting up the induction-motor, thereby putting potential on the direct-current mains 34 34$^a$ and permitting the motor-vehicle to be charged by moving the switch-handle 4, bridging the contact-terminals 14 14$^a$. The magnet 16$^a$ and the meter-circuits and also the meter-actuated cut-out disk 22, corresponding to similar parts of Fig. 1, are connected in the direct-current circuit. When, therefore, the meter has rotated the disk 22 a complete revolution, the circuit including the magnet 16$^a$ is opened, permitting the retractile spring to withdraw the armature 17 and release the switch 8 to the control of its operating-spring, disconnecting the induction-motor from the low-potential alternating-service wires and preventing further supply of energy until further payment is made. The construction of the operating-spring for the switch 8 is shown in detail in Fig. 5 and will be understood upon inspection without further description.

The winding-magnet for the clock requiring permanent or at least regular supply of current may be tapped from the low-potential alternating mains $a\,b$, including a resistance, if desired, as indicated at 39, and in shunt to the same branch may be included the leads which control magnets 27 $27^a$ of Fig. 3, as indicated in dotted lines $a'\,b'$.

What I claim as new, and desire to secure by Letters Patent of the United States, is—

1. A vending device for electric energy, comprising a closed casing containing leads to electric supply-mains, circuit-terminals within the same adapted for connection with a battery to be charged, said terminals being normally inaccessible, and toll-controlled mechanism for rendering the terminals accessible.

2. A vending device for electric energy, comprising a closed casing containing leads to electric supply-mains, circuit-terminals within the same adapted for connection with a battery to be charged, a cover to render said terminals normally inaccessible, and toll-controlled mechanism for rendering the terminals accessible.

3. A vending device for electric energy, comprising a closed casing, normally dead terminals within the same, adapted for connection with an external device to be charged, means for obstructing access thereto, a switch to connect the terminals with a source of supply, and toll-controlled means for rendering the terminals accessible and alive.

4. A vending device for electric energy, comprising circuit-terminals for delivering current, said terminals being operatively related to an electric supply-circuit, a cover normally closing the same against access, toll-operated releasing devices for exposing the terminals, and an automatic device to open the circuit after a determinate amount of energy has been delivered.

5. A vending device for electric energy, comprising normally inaccessible and dead circuit-terminals adapted for connection with an external device to be charged, toll-controlled mechanism for rendering them accessible and alive, and a measuring device to open the circuit after the value of the toll in current has been delivered.

6. A vending device for electric energy, comprising normally inaccessible terminals for delivering current to a battery to be charged exterior to the vending device, said terminals being operatively related to the electric supply-circuit, a toll-operated circuit-closer within the device and normally inaccessible, toll-operated mechanism for operating the circuit-closer, and a wattmeter to open the circuit when the value of the toll in current has been delivered.

7. A vending device for electric energy, comprising a closed casing, leads from a supply-circuit therein, toll-operated devices within the inclosure controlling the supply of current, a normally inaccessible flexible cable containing current-leads to connect with a battery, and means governed by the introduction of toll for permitting access to the cable.

8. A vending device for electric energy, comprising a closed casing containing charging-terminals, leads from a supply-circuit operatively related to said terminals, a hand-operated switch within the casing for connecting and disconnecting the terminals, toll-controlled devices for making the switch accessible, and a toll-controlled switch permanently inaccessible to a customer, for cutting in and out the hand-switch.

9. A vending device for electric energy, comprising a closed casing containing charging-terminals, leads from a supply-circuit operatively related to said terminals, a hand-operated switch within the casing, toll-controlled devices giving access to the same, means for opening the switch when the casing is closed, and a toll-controlled switch permanently inaccessible to a customer for connecting and disconnecting the hand-switch with the service-wires.

10. A vending device for electric energy comprising a closed casing containing circuit-terminals by which energy may be supplied to electrically-operated vehicles, leads from an electric supply-circuit operatively related to said terminals, a door giving access to said terminals, a lock for the door, and toll-controlled devices for releasing the lock.

11. A vending device for electric energy, comprising a closed casing containing circuit-terminals, a door giving access thereto, a toll-controlled lock for the door, a retractile circuit-closer operated by the door, and means for breaking the circuit independently of the door after the value of the toll in current has been delivered.

12. A vending device for electric energy, comprising a closed casing, a door, a circuit-closer operated thereby, a toll-controlled lock for the door, and measuring devices for opening the circuit-closer after the value of the toll in current has been delivered.

13. A vending device for electric energy, comprising a closed casing, a door, a circuit-closer operated thereby, means permitting disconnection of the door and circuit-closer after closure of the latter, a toll-controlled lock for the door, and measuring devices for opening the circuit-closer after the value of the toll in current has been delivered.

14. A vending device for electric energy, comprising a closed casing, a slot for a coin or token, a control-circuit closed by the coin and governing delivery of current, a current-measuring device for cutting off the current at the proper time, normally inaccessible circuit-terminals adapted for connection with an external device to be charged, and toll-controlled means for rendering said terminals accessible.

15. A vending device for electric energy, comprising a closed casing, toll-operated devices for closing the circuit with a source of supply, means for operating said devices by tolls of different value, and automatic devices restricting admission of the respective toll values to determinate hours.

16. A vending device for electric energy, comprising a closed casing, toll-operated devices for closing the circuit with a source of supply, means for operating said devices by tolls of different value, and an electrically-wound clock restricting admission of the respective toll values to definite hours.

17. A vending device for electric energy, comprising a closed casing, toll-operated devices for closing the circuit with a source of supply, toll-slots for tolls of different value, and a clock-controlled device for obstructing the several slots at different periods of time.

18. A vending device for electric energy, comprising a closed casing, toll-operated devices within the same governing closure of the circuit of an alternating-current motor-generator, terminals for connecting a storage battery with the direct-current side of the motor-generator, and an automatic device for opening the alternating supply to the motor-generator after the value of the toll in current has been delivered.

19. A vending device for electric energy, comprising a transformer, toll-controlled apparatus for connecting its secondary with a motor-generator, and terminals adapted to connect the direct-current side of the motor-generator with a translating device.

In witness whereof I have hereunto set my hand this 26th day of November, 1900.

CARYL D. HASKINS.

Witnesses:
   BENJAMIN B. HULL,
   MARGARET E. WOOLLEY.